(12) United States Patent
Haraguchi et al.

(10) Patent No.: US 7,579,808 B2
(45) Date of Patent: Aug. 25, 2009

(54) BATTERY PACK HAVING IC TAG FOR DETECTING MODIFICATION

(75) Inventors: Kazunori Haraguchi, Osaka (JP); Fumio Daio, Osaka (JP)

(73) Assignee: Panasonic Corporation, Osaka (JP)

( * ) Notice: Subject to any disclaimer, the term of this patent is extended or adjusted under 35 U.S.C. 154(b) by 285 days.

(21) Appl. No.: 11/434,910

(22) Filed: May 17, 2006

(65) Prior Publication Data

US 2006/0263650 A1 Nov. 23, 2006

(30) Foreign Application Priority Data

May 18, 2005 (JP) ............................. 2005-144805

(51) Int. Cl.
*H02J 7/00* (2006.01)
(52) U.S. Cl. ...................... 320/106; 320/107; 320/112
(58) Field of Classification Search ................ 320/106, 320/112, 107, 114; 340/539.13
See application file for complete search history.

(56) References Cited

U.S. PATENT DOCUMENTS

| | | | | |
|---|---|---|---|---|
| 5,717,307 A | * | 2/1998 | Barkat et al. ............. | 340/636.1 |
| 5,831,412 A | * | 11/1998 | Morioka et al. ............ | 320/106 |
| 5,917,305 A | * | 6/1999 | Faulk ......................... | 320/106 |
| 5,932,989 A | * | 8/1999 | Thandiwe et al. .......... | 320/106 |
| 6,181,103 B1 | * | 1/2001 | Chen .......................... | 320/106 |
| 6,359,417 B1 | * | 3/2002 | Winkler ..................... | 320/106 |
| 2004/0239291 A1 | * | 12/2004 | Watanabe ................... | 320/106 |
| 2005/0035738 A1 | * | 2/2005 | Patino et al. ............... | 320/106 |
| 2006/0028173 A1 | * | 2/2006 | Sellers ....................... | 320/112 |
| 2006/0038536 A1 | * | 2/2006 | LaFollette et al. .......... | 320/112 |
| 2006/0267544 A1 | * | 11/2006 | Montvay et al. ............ | 320/106 |

FOREIGN PATENT DOCUMENTS

| | | |
|---|---|---|
| JP | 2003-84672 A | 3/2003 |
| JP | 2003-168406 A | 6/2003 |

* cited by examiner

*Primary Examiner*—Akm E Ullah
*Assistant Examiner*—Arun Williams
(74) *Attorney, Agent, or Firm*—McDermott Will & Emery LLP

(57) ABSTRACT

A battery pack includes an IC tag carrying predetermined information. The IC tag stops functioning when the battery pack is disassembled or modified so that recorded information cannot be read out, whereby an act of disassembling or modification is detected, connection of an unqualified battery pack to a loading device or charging device is prevented, and connection of a counterfeit is prevented.

12 Claims, 2 Drawing Sheets

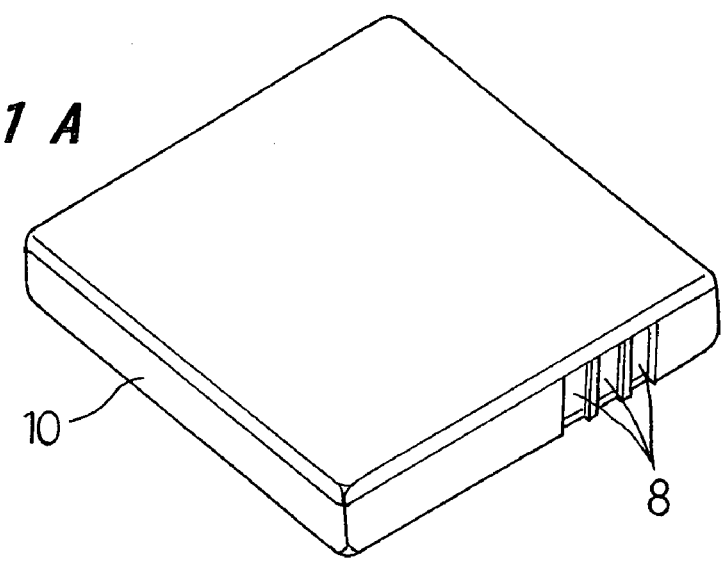
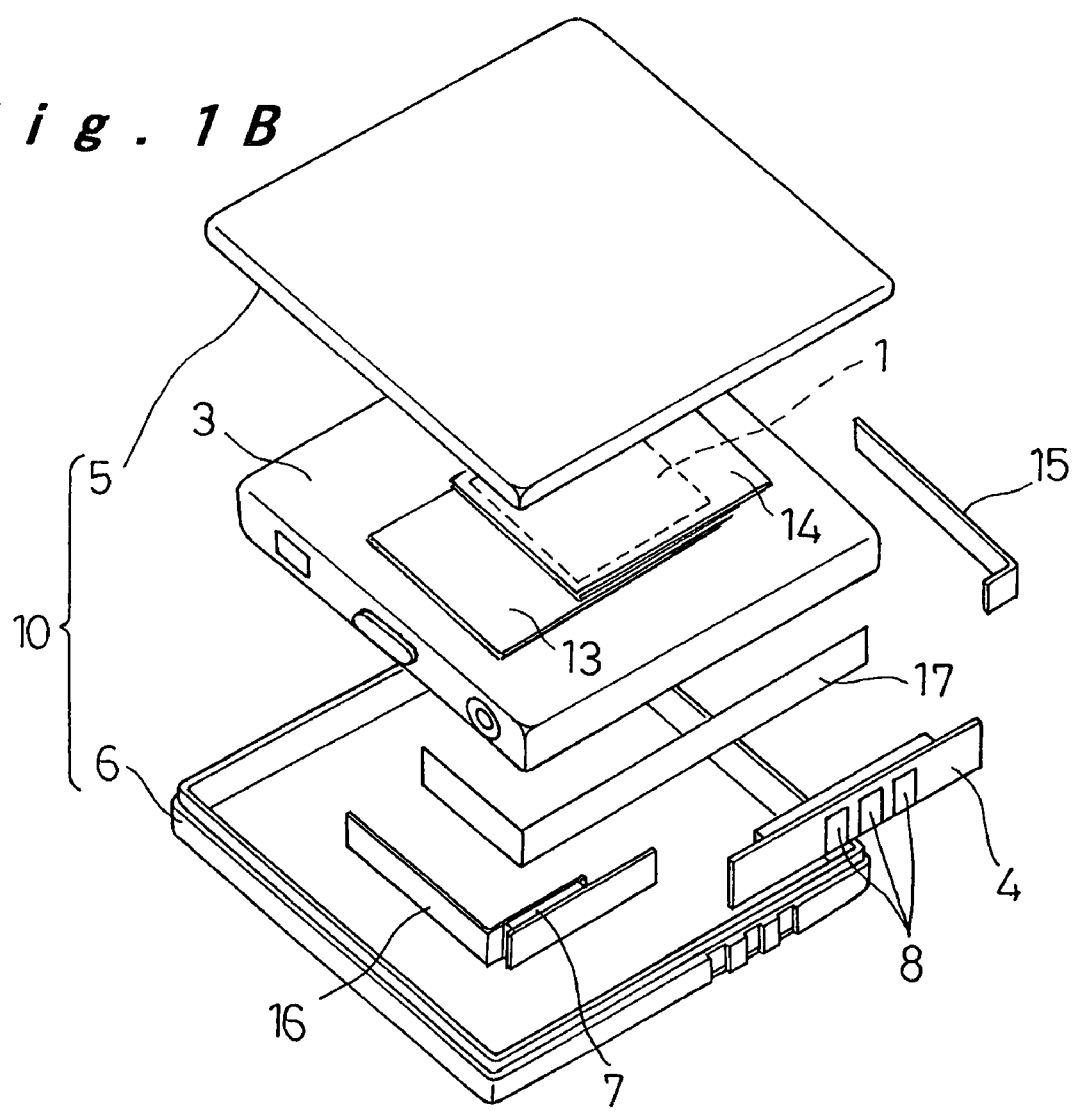

BATTERY PACK HAVING IC TAG FOR DETECTING MODIFICATION

The present disclosure relates to subject matter contained in priority Japanese Patent Application No. 2005-144805, filed on May 18, 2005, the contents of which is herein expressly incorporated by reference in its entirety.

BACKGROUND OF THE INVENTION

1. Technical Field of the Invention

The present invention relates to a battery pack having a structure that prevents reliability degradation, a breakdown or malfunction caused by unauthorized disassembling or modification of the battery or parts of the battery pack.

2. Description of the Related Art

When the rechargeable battery of a battery pack that is used as the power source of equipment has come to the end of its life after repeated charge and discharge, the whole battery pack is supposed to be replaced, but sometimes the user may replace only the rechargeable battery by himself. Also, there is a dealer who provides service of changing rechargeable batteries of battery packs so that the packs can be used again.

However, battery packs usually include a control circuit suitably designed for the characteristics and performance of the rechargeable batteries and for a loading device and a charging device to which the battery pack is connected. The rechargeable battery in the pack should always be replaced by the same type of battery made by the same manufacturer and having the same characteristics and performance, which is hard to achieve because there are variations in the characteristics and performance even among the batteries made by the same manufacturer. Not to mention, if the battery is replaced with a product of a different manufacturer, or a wrong type of battery, the battery pack reliability is lost, and the equipment that uses such a modified battery pack may malfunction, break down, or cause an accident.

Moreover, most battery packs are made up of a combination of two or more rechargeable batteries having corresponding characteristics and performance, with a control circuit designed in accordance with the types of rechargeable batteries to secure desired performance and reliability. Therefore, batteries that meet the same standards may not necessarily promise designed performance, and moreover, the battery pack protection mechanism for preventing abnormal heat generation or volume expansion of batteries may not function normally.

It is important to prevent battery packs from being disassembled and modified by a person or a dealer other than the manufacturer or a dealer designated by the manufacturer for securing reliability and credibility of the manufacturer to the users. Accordingly, there are known a battery pack structure that prevents disassembling or modification, and an adhesive tape that leaves a mark when the battery or other parts are removed for preventing modification (see Japanese Patent Publication No. 2003-084672).

The battery pack needs to be compatible with the loading device which operates by the battery discharge power and with the charging device which supplies power to the batteries, and requires a feature for preventing an unauthorized product to be connected and preventing the battery pack from being charged in a wrong manner, so as to prevent damage to the loading device or to the rechargeable batteries. Counterfeit battery packs, in particular, which appear exactly the same as the genuine battery pack, are widespread, and many accidents have been reported, including a fire accident of a counterfeit battery pack and damage to the equipment for which a counterfeit was used. Therefore, there have been demands for development of means for distinguishing a counterfeit from a genuine product and means for preventing a wrong battery pack to be connected to a loading device and a charging device, and as one example to meet these demands, a battery pack structure is known in which an IC tag outputs a true or false signal in response to a corresponding radio wave signal from the loading device and charging device (see Japanese Patent Publication No. 2003-168406).

A battery pack is not just a rechargeable battery encased in a pack case but includes a circuit substrate, on which are formed a protection circuit for protecting the rechargeable battery from overcharging or overdischarging, a circuit for calculating remaining power, and a power source control circuit for controlling the operating state of the battery. If the rechargeable battery or circuit substrate is improperly modified or changed, the battery pack cannot be guaranteed to operate correctly, and moreover, it may lead to abnormal heat generation or volume expansion of the battery. The same applies with a counterfeit battery pack, since its rechargeable battery and circuit substrate are not correctly configured.

There is a limit, however, to prevent modification by structural measures, and a trace of modification is sometimes deftly concealed. The problem was that, because of this difficulty in preventing modification in a reliable manner, it is always after a breakdown or accident has occurred that the battery pack is found to have been modified.

The conventional IC tag is effective in recognizing a counterfeit, but was useless in detecting an act of modification.

BRIEF SUMMARY OF THE INVENTION

In view of the above problems of the conventional techniques, an object of the present invention is to provide a battery pack having a structure that identifies both an act of modification and a counterfeit to prevent unauthorized modification or battery replacement and to enable identification of counterfeits.

To achieve the above object, according to one aspect of the present invention, a battery pack wherein a battery is encased in a pack case includes an IC tag carrying predetermined information and bonded to the surface of the battery and to the inner face of the pack case. With this structure, when the pack case is opened to take out the battery, the IC tag bonded to both of the battery and pack case is damaged and stops functioning, whereby the information recorded on the IC tag cannot be read out, so that it is recognized that the battery pack has been disassembled or modified.

To achieve the above object, according to a second aspect of the present invention, a battery pack wherein a battery and a circuit substrate are encased in a pack case includes an IC tag carrying predetermined information and bonded to the surfaces of the battery and circuit substrate. With this structure, when the battery is removed or changed, or when the circuit substrate is tampered with, the IC tag bonded to both of the battery and circuit substrate is damaged and stops functioning, whereby the information recorded on the IC tag cannot be read out, so that it is recognized that the battery pack has been disassembled or modified.

To achieve the above object, according to a third aspect of the present invention, a battery pack wherein a battery and a circuit substrate are encased in a pack case includes an IC tag carrying predetermined information and bonded to the surface of the circuit substrate and to the inner face of the pack case. With this structure, when the pack case is opened to take out the circuit substrate, the IC tag bonded to both of the circuit substrate and pack case is damaged and stops functioning, whereby the information recorded on the IC tag cannot be read out, so that it is recognized that the battery pack has been disassembled or modified.

To achieve the above object, according to a fourth aspect of the present invention, a battery pack wherein a battery is encased in a pack case made of a container and a lid to close the opening includes an IC tag carrying predetermined information and set inside the pack case such that its one end is bonded to the container and its other end is bonded to the lid. With this structure, when the pack case is opened apart, the IC tag bonded to the container and the lid is damaged and stops functioning, whereby the information recorded on the IC tag cannot be read out, so that it is recognized that the battery pack has been disassembled or modified.

In the above various aspects of the invention, an IC chip constituting the IC tag is formed with a groove or a notch in a direction in which bending stress is applied when the battery and the pack case, and/or the battery and the circuit substrate, and/or the circuit substrate and the pack case, and/or the container and the lid, are brought apart. Thereby, when bending stress is applied to the IC tag that works to separate the tag from the parts which it was bonded to, the IC chip is damaged and stops functioning, so that any harm caused by reading out the recorded information or abuse or misuse of the IC chip is prevented.

The information recorded on the IC tag contains compatibility identification data for identifying compatibility of the battery pack with a loading device or a charging device to which it is connected, so as to avoid a breakdown caused by connecting the battery pack to a wrong type of loading device, or damage to the rechargeable battery caused by connecting the battery pack to a wrong type of charging device to charge the battery.

The information recorded on the IC tag also contains authenticity identification data for distinguishing between a counterfeit and a genuine battery pack so as to identify a counterfeit that appears exactly the same as the genuine battery pack, to prevent a breakdown or accident caused by the use of a counterfeit, and to avoid credibility loss of the manufacturer.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 1A is a perspective outer view and FIG. 1B is an exploded perspective view illustrating the structure of a battery pack according to one embodiment of the present invention.

DESCRIPTION OF THE PREFERRED EMBODIMENTS

Figure 2A:
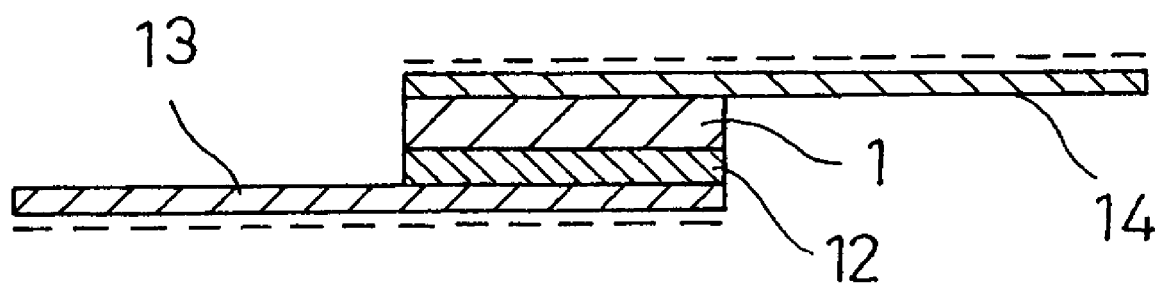
FIG. 2A is a cross-sectional view of an IC tag with an adhesive sheet attached thereon and FIG. 2B is a perspective view illustrating the IC tag structure according to one embodiment of the present invention.

Preferred embodiments of the present invention will be hereinafter described with reference to FIG. 1A to FIG. 2B. The following description is given for illustrating examples of embodiment of the invention and is not intended to limit the technical scope of the invention.

FIG. 1A illustrates one example of a battery pack designed as the battery power source of portable electronic equipment. As shown in the exploded view of FIG. 1B, a flat prismatic battery 3 structured as a lithium ion rechargeable battery and a circuit substrate 4 including a battery protection circuit and the like are accommodated in a pack case 10, which is made up of a lower case (container) 6 and an upper case (lid) 5.

In such a battery pack using a lithium ion rechargeable battery, a battery protection circuit controls charge and discharge to protect the battery 3 from being overcharged or overdischarged, and a PTC element 7 prevents damage of the battery 3 caused by external short-circuiting. The external connection terminals 8 for connecting the battery pack to a loading device or a charging device include, in addition to a positive terminal and a negative terminal, a temperature detecting terminal, so that charging is controlled in accordance with the battery temperature. These are basic features of a battery pack of a lithium ion battery, and battery packs for use in mobile computers further include a function of calculating remaining power of the battery 3 and a function of transmitting and receiving various information.

It is essential for such battery pack to be compatible with the loading device which operates by the battery discharge power and with the charging device which supplies power to the battery 3; if it is connected to a wrong type of device, the battery pack or the device may be damaged and a fault may occur. There are counterfeits that appear exactly the same as the genuine battery pack, and accidents such as fire have been reported, which were caused by the use of a wrong type of battery or components. Accordingly, it is necessary to prevent the battery pack from being connected to an incompatible loading device and charging device, and to distinguish a counterfeit from a genuine battery pack.

Rechargeable batteries are repeatedly used by charging, however, there is a limit in battery life. Basically, when the rechargeable battery of the battery pack has come to the end of its life, the battery pack may be used again by changing the battery. There are, however, variations in the characteristics of the battery, and the replaced battery should be the one made by the same manufacturer and have the same characteristics, so that the protection circuit and control circuit operate appropriately and the battery pack operate normally. However, there are dealers who change batteries in battery packs that are no longer usable because the battery life has ended. Dissembling or modifying the battery pack not only cancels the operation guarantee of the battery pack but also may cause a breakdown or accident, and if a situation arises in which the fault affects the operation of the loading device or charging device, not only the battery pack manufacturer but also the device manufacturer and sales dealer will lose their credibility. Accordingly, it is necessary to prevent the battery pack from being disassembled or modified, and to make it clear when it is disassembled or modified.

The battery pack according to the present embodiment includes an IC tag 1, which carries information for identifying a compatible loading device and charging device, and for identifying a counterfeit, and which breaks when the battery pack is disassembled or modified so that the battery pack cannot be connected to the loading device and charging device.

Figure 2B:
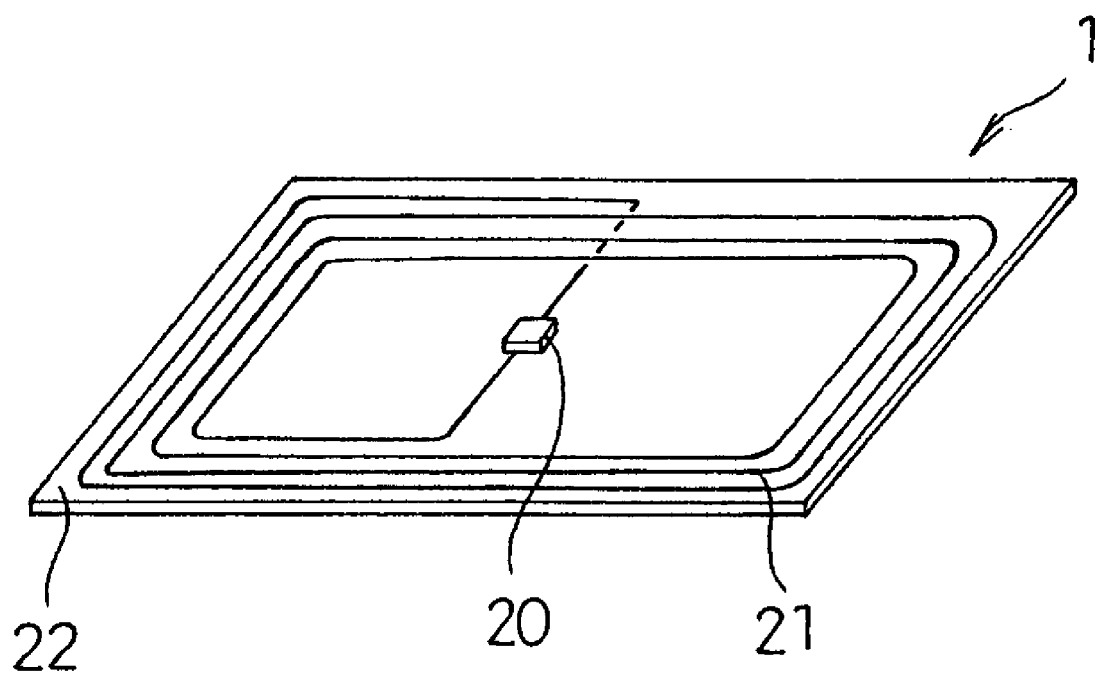

The IC tag 1 used here includes adhesive sheets 13 and 14 bonded on both sides of the IC tag 1 as shown in FIG. 2A. The IC tag 1 is a metal-compatible type and so the adhesive sheet 13 on the side of the battery 3 is bonded to the IC tag 1 via an amorphous sheet 12 whereby a decrease in communication distance from the IC tag 1 to the metal-covered battery 3 is prevented. As shown in FIG. 2B, the IC tag 1 includes a coiled antenna 21 provided on a plastic film 22 by means of any of metal deposition, etching, or screen printing, and an IC chip 20 is connected to both ends of the antenna 21.

The IC tag 1 is bonded to the battery 3 by the adhesive sheet 13, and after the battery 3 and the circuit substrate 4 are connected to each other by lead plates 15 and 16 and accommodated in the lower case 6, the open side of the lower case 6 is closed by the upper case 5, and the upper and lower cases 5 and 6 are pressed together and joined in the periphery by ultrasonic welding, whereby the IC tag 1 is bonded to the inner face of the upper case 5 by the adhesive sheet 14. That is, the IC tag 1 is joined to both of the battery 3 and to the pack case 10.

The IC chip 20 in the IC tag 1 carries identification information of the battery pack. When the battery pack is connected to a loading device or a charging device, an ID information reader in the device outputs an electromagnetic wave signal to read out the ID information from the IC tag 1. The device matches the ID information with predetermined data to determine the compatibility of the battery pack, and if the battery pack is determined to be incompatible, then it does not allow charging or discharging. Therefore, any abnormality or a breakdown which may be brought about by an incompatible battery being connected is prevented. The read-out ID information is also used for determining whether the battery pack is a genuine product or a counterfeit, and therefore any breakdown or accident caused by a counterfeit being connected is prevented.

If this battery pack is disassembled with the intention of changing the battery 3 or adding a modification, the IC tag 1 bonded to both of the battery 3 and the upper case 5 is damaged by pulling stress applied when the upper case 5 is separated from the battery 3. The IC tag will then not respond to the ID information reader of the device, and the device, when there is no response from the tag, does not permit charging or discharging. Accordingly, a battery pack that has been disassembled once cannot be used again.

The means for causing damage to the IC tag 1 when pulling stress is applied includes a structure which will destroy the connection between the IC chip and the antenna that make up the IC tag 1, a structure which will destroy the antenna, and a structure which will destroy the IC chip, or a combination of these structures.

The structure which will destroy the connection between the IC chip and antenna or the structure which will destroy the antenna may be formed by providing a weak part in the antenna line or connection line on the film so that it will break by the tension applied from the adhesive sheets 13 and 14. The structure which will destroy the IC chip may be formed by providing a groove or notch in part of the IC chip in a direction in which bending stress will be applied, so that the IC chip will be cut at this groove or notch by the pulling stress and the IC tag 1 will stop functioning. This structure which will destroy the IC chip is also effective in preventing the IC chip to be removed for misuse.

While the IC tag 1 is arranged between the battery 3 and the pack case 10 in the above-described embodiment, it may be placed between the circuit substrate 4 and the pack case 10 to cause the IC tag 1 to stop functioning when the pack is disassembled. Also, the same effects will be achieved if the IC tag 1 is arranged between the battery 3 and circuit substrate 4.

Alternatively, the IC tag 1 may be mounted so that the adhesive sheets 13 and 14 attach to the upper case 5 and the lower case 6 that form the pack case respectively. When the pack case 10 is disassembled, the pulling stress is applied to the IC tag 1, and the IC tag 1 stops functioning.

According to the present invention, an IC tag, which carries information for determining compatibility with a loading device or charging device and for identifying a counterfeit, is mounted in a position where it will break when the battery pack is disassembled or modified, so that the IC tag carrying the information stops functioning when the battery pack is disassembled or modified. An evidence remains that the battery pack has been disassembled or modified, and operation guarantee is canceled, and therefore credibility loss caused by a breakdown or accident that may be brought about by disassembling or modification is prevented. ID information indicative of the compatibility with a loading device or charging device, or ID information for distinguishing a counterfeit from a genuine product, is recorded on the IC tag, so that a battery pack that may fail to operate properly because it has been modified or because it is a counterfeit will not be connected to the loading device or charging device.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery pack comprising:
   a pack case;
   a battery encased in the pack case; and
   an IC tag carrying predetermined information and bonded to a surface of the battery and to an inner face of the pack case; wherein the IC tag includes an IC chip, and the IC chip is formed with a groove or a notch in a direction in which bending stress is applied when the battery and the pack case are brought apart.

2. The battery pack according to claim 1, wherein the information recorded on the IC tag contains compatibility identification data for identifying compatibility of the battery pack with a loading device or a charging device to which the battery pack is connected.

3. The battery pack according to claim 1, wherein the information recorded on the IC tag contains authenticity identification data for distinguishing between a counterfeit and a genuine battery pack.

4. A battery pack comprising:
   a pack case;
   a battery and a circuit substrate which are encased in the pack case; and
   an IC tag carrying predetermined information and bonded to surfaces of the battery and the circuit substrate; wherein the IC tag includes an IC chip, and the IC chip is formed with a groove or a notch in a direction in which bending stress is applied when the battery and the circuit substrate are brought apart.

5. The battery pack according to claim 4, wherein the information recorded on the IC tag contains compatibility identification data for identifying compatibility of the battery pack with a loading device or a charging device to which the battery pack is connected.

6. The battery pack according to claim 4, wherein the information recorded on the IC tag contains authenticity identification data for distinguishing between a counterfeit and a genuine battery pack.

7. A battery pack comprising:
   a pack case;
   a battery and a circuit substrate which are encased in the pack case; and
   an IC tag carrying predetermined information and bonded to a surface of the circuit substrate and to an inner face of the pack case; wherein the IC tag includes an IC chip, and the IC chip is formed with a groove or a notch in a direction in which bending stress is applied when the circuit substrate and the pack case are brought apart.

8. The battery pack according to claim 7, wherein the information recorded on the IC tag contains compatibility identification data for identifying compatibility of the battery pack with a loading device or a charging device to which the battery pack is connected.

9. The battery pack according to claim 7, wherein the information recorded on the IC tag contains authenticity identification data for distinguishing between a counterfeit and a genuine battery pack.

10. A battery pack comprising:
  a pack case made of a container and a lid to close an opening of the container;
  a battery encased in the pack case; and
  an IC tag carrying predetermined information and set inside the pack case such that one end of the IC tag is bonded to the container and the other end of the IC tag is bonded to the lid; wherein the IC tag includes an IC chip, and the IC chip is formed with a groove or a notch in a direction in which bending stress is applied when the container and the lid, are brought apart.

11. The battery pack according to claim 10, wherein the information recorded on the IC tag contains compatibility identification data for identifying compatibility of the battery pack with a loading device or a charging device to which the battery pack is connected.

12. The battery pack according to claim 10, wherein the information recorded on the IC tag contains authenticity identification data for distinguishing between a counterfeit and a genuine battery pack.

* * * * *